United States Patent
Wu et al.

(10) Patent No.: US 7,185,291 B2
(45) Date of Patent: Feb. 27, 2007

(54) COMPUTER WITH A TOUCH SCREEN

(75) Inventors: Chin-Wang Wu, Taipei (TW); Jain-Shing Wu, Taipei (TW)

(73) Assignee: Institute for Information Industry (TW)

( * ) Notice: Subject to any disclaimer, the term of this patent is extended or adjusted under 35 U.S.C. 154(b) by 732 days.

(21) Appl. No.: 10/377,652

(22) Filed: Mar. 4, 2003

(65) Prior Publication Data

US 2004/0174399 A1 Sep. 9, 2004

(51) Int. Cl.
*G06F 17/00* (2006.01)
*G09G 5/00* (2006.01)

(52) U.S. Cl. .............. 715/863; 345/179; 345/173; 715/864; 715/541

(58) Field of Classification Search ........... 715/863, 715/864, 866, 700, 539–541; 345/179, 168, 345/173, 441; 382/186, 189
See application file for complete search history.

(56) References Cited

U.S. PATENT DOCUMENTS

| | | | |
|---|---|---|---|
| 5,671,438 A * | 9/1997 | Capps et al. ............ 715/539 |
| 5,677,710 A * | 10/1997 | Thompson-Rohrlich .... 345/173 |
| 5,850,477 A * | 12/1998 | Takada ..................... 382/186 |
| 6,340,967 B1 * | 1/2002 | Maxted ..................... 345/179 |
| 6,442,578 B1 * | 8/2002 | Forcier ..................... 715/541 |
| 6,683,600 B1 * | 1/2004 | Lui ............................ 345/179 |
| 6,938,220 B1 * | 8/2005 | Shigematsu et al. ........ 715/863 |
| 7,002,560 B2 * | 2/2006 | Graham .................... 345/179 |
| 2003/0128244 A1 * | 7/2003 | Iga et al. .................... 345/863 |
| 2004/0140956 A1 * | 7/2004 | Kushler et al. ............. 345/168 |

* cited by examiner

Primary Examiner—Tadesse Hailu
(74) Attorney, Agent, or Firm—Bacon & Thomas PLLC (57) ABSTRACT

The present invention relates to a computer with a touch screen, and the user can execute one of "undo", "cut", "copy" and "paste" editing commands by a continuous stroke movement to increase the input operational efficiency. For example, after marking an area on the screen, if the subsequent stroke is moved downwards, the "cut" operation is performed, and if the subsequent stroke is moved upwards, the "copy" operation is performed. Furthermore, when the user stops the stroke at a predetermined position, if the subsequent stroke is moved towards the right, the "paste" operation is performed, and if the subsequent stroke is moved towards the left, the "undo" operation is performed.

12 Claims, 8 Drawing Sheets

Hi, I found a wonderful tool to edit a document. Please tell your friends this good and wonderful news.
Yes!

Hi, I found a wonderful tool to edit a document. Please tell your friends this good and wonderful news.
Yes!

Hi, I found a wonderful tool to edit a document. Please tell your friends this good and wonderful news.

Yes!

Hi, I found a wonderful tool to edit a document. Please tell your friends this good and wonderful news.

Yes!

Hi, I found a wonderful tool to edit a document. Please tell your friends this good and wonderful news.

Yes! friends

Hi, I found a wonderful tool to edit a document. Please tell your friends this good and wonderful news.

Yes!

> Hi, I found a wonderful tool to edit a document. Please tell your this good and wonderful news.
>
> Yes!

> Hi, I found a wonderful tool to edit a document. Please tell your this good and wonderful news.
>
> Yes!

Hi, I found a wonderful tool to edit a document. Please tell your friends this good and wonderful news.
Yes!

Hi, I found a wonderful tool to edit a document. Please tell your friends this good and wonderful news.
Yes!

Hi, I found a wonderful tool to edit a document. Please tell your friends this good and wonderful news.

Yes!

Hi, I found a wonderful tool to edit a document. Please tell your this good and wonderful news.

Yes! friends

FIG. 15

COMPUTER WITH A TOUCH SCREEN

BACKGROUND OF THE INVENTION

1. Field of the Invention

The present invention relates to a computer with a touch screen and, more particularly, to a computer performing "undo", "cut", "copy" and "paste" editing commands in an icon windowing environment.

2. Description of Related Art

The present invention is used to improve the operational efficiency when a user executes an "undo" command, a "cut" command, a "copy" command or a "paste" command to edit documents or text in an icon windowing environment. Currently, computer systems and intelligent mobile devices all have a user interface that utilizes an icon windowing environment, and provides application programs with "undo", "cut", "copy" and "paste" editing commands. In order to perform the above-mentioned commands, the user needs to perform the following steps: 1. Mark an area. 2(a). If in a PC icon windowing environment, the user needs to move the cursor to the marked area and click the right button (or left button) to select an operation. 2(b). If in a computer with a touch screen, such as a PDA (personal digital assistant) or a Tablet PC, the user needs to place the tip of the touch pen in the marked area, and when a little winpop appears, the user can select one of the "undo", "cut", "copy" or "paste" editing commands (or click one of the "undo", "cut", "copy" and "paste" buttons) to execute an operation. 3. If the user executes the "cut" or "copy" operation to fill data from the marked area into a clip board to later execute a "paste" operation, the user must place the touch pen in a desired position, and then follow the above-mentioned steps 2(a) or 2(b) to execute the "paste" operation.

The above-mentioned traditional steps are very inconvenient for a prior art computer with a touch screen.

SUMMARY OF THE INVENTION

The object of the present invention is to provide a more convenient operating method for a computer with a touch screen, which can execute one of the "undo", "cut", "copy" and "paste" editing commands by way of a continuous stroke movement to increase the operational efficiency of the input environment.

In order to achieve the above-mentioned object, in an embodiment of the present invention, after a user marks an area, the computer determines if a retention period of the stroke exceeds a predetermined period, when the retention period exceeds the predetermined period, the computer enters into a stroke editing state. In the stroke editing state, if a subsequent stroke is downwards, the "cut" operation is performed; if the subsequent stroke is upwards, the "copy" operation is performed.

Otherwise, when the user stops the stroke at a predetermined position, the computer determines if a retention period of the stroke exceeds a predetermined period, and when the retention period exceeds the predetermined period, the computer enters into a stroke editing state. In the stroke editing state, if the subsequent stroke is towards the right, the "paste" operation is performed; if the subsequent stroke is towards the left, the "undo" operation is performed.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
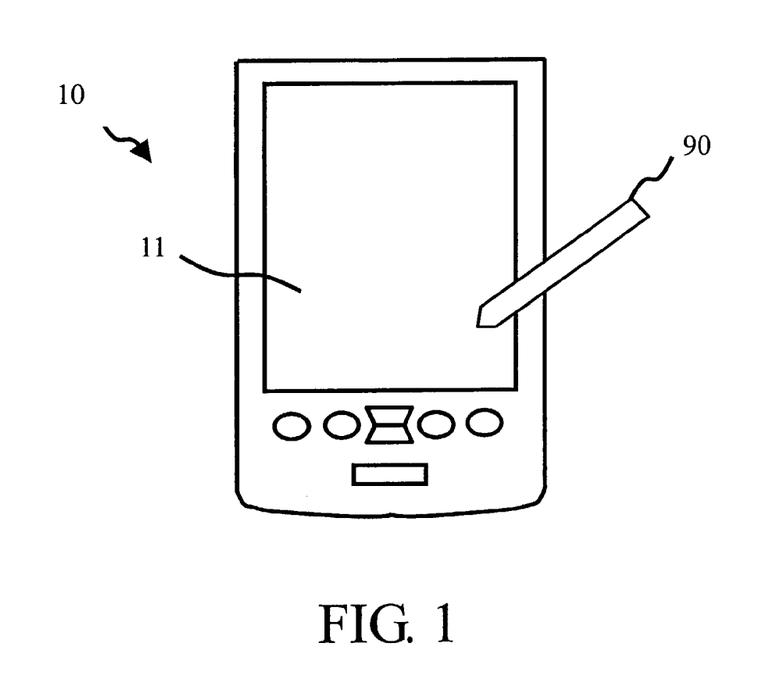
FIG. 1 illustrates a schematic drawing of a computer with a touch screen of the present invention.

Please refer to FIG. 1. FIG. 1 illustrates a schematic drawing of a computer with a touch screen of the present invention. In an embodiment, a computer 10 with a touch screen 11 is a PDA. A user utilizes a touch pen 90 (which is usually a thin long rod that is designed to be held easily by the user) to input data via the touch screen 11.

Figure 2:
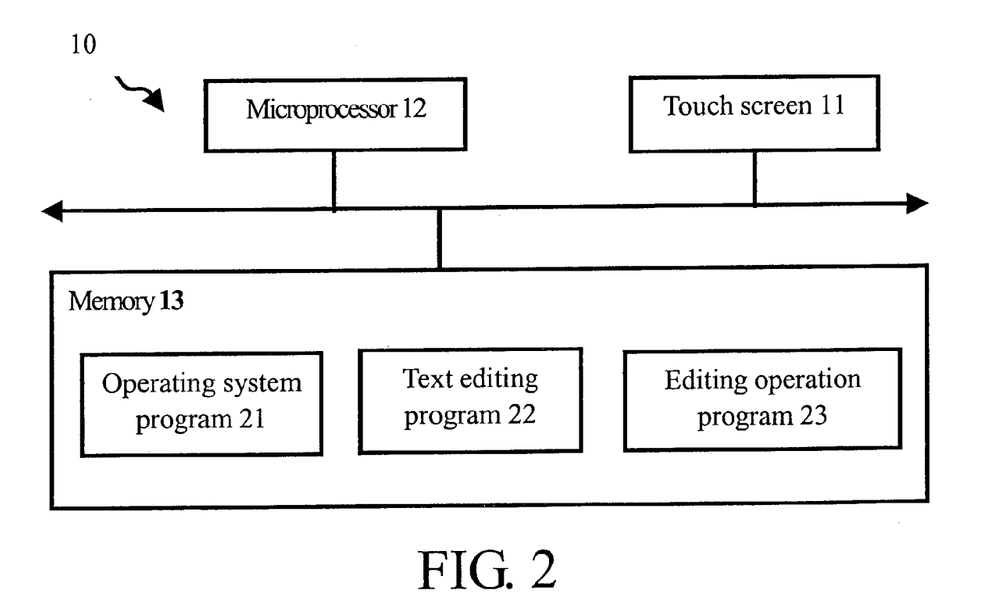
FIG. 2 is a circuit block drawing of a computer with a touch screen of the present invention.

Please refer to FIG. 2. FIG. 2 is a circuit block drawing of the computer 10 with a touch screen according to the present invention. The computer 10 has a typical arrangement with a microprocessor 12 and a memory 13. The memory 13 is loaded with the necessary operating system program 21 (currently, a windowing system), data files and different application programs. In the present invention, the application program comprises a text editing program 22 and an editing operation program 23. The user may use the text editing program 22 (such as Microsoft Word) to input and edit text. A main characteristic of the present invention is to utilize the special editing operation program 23, and the editing operation program 23 can be plug-in software, or alternatively may be embedded into other software, such as the operating system program 21.

Figure 3:
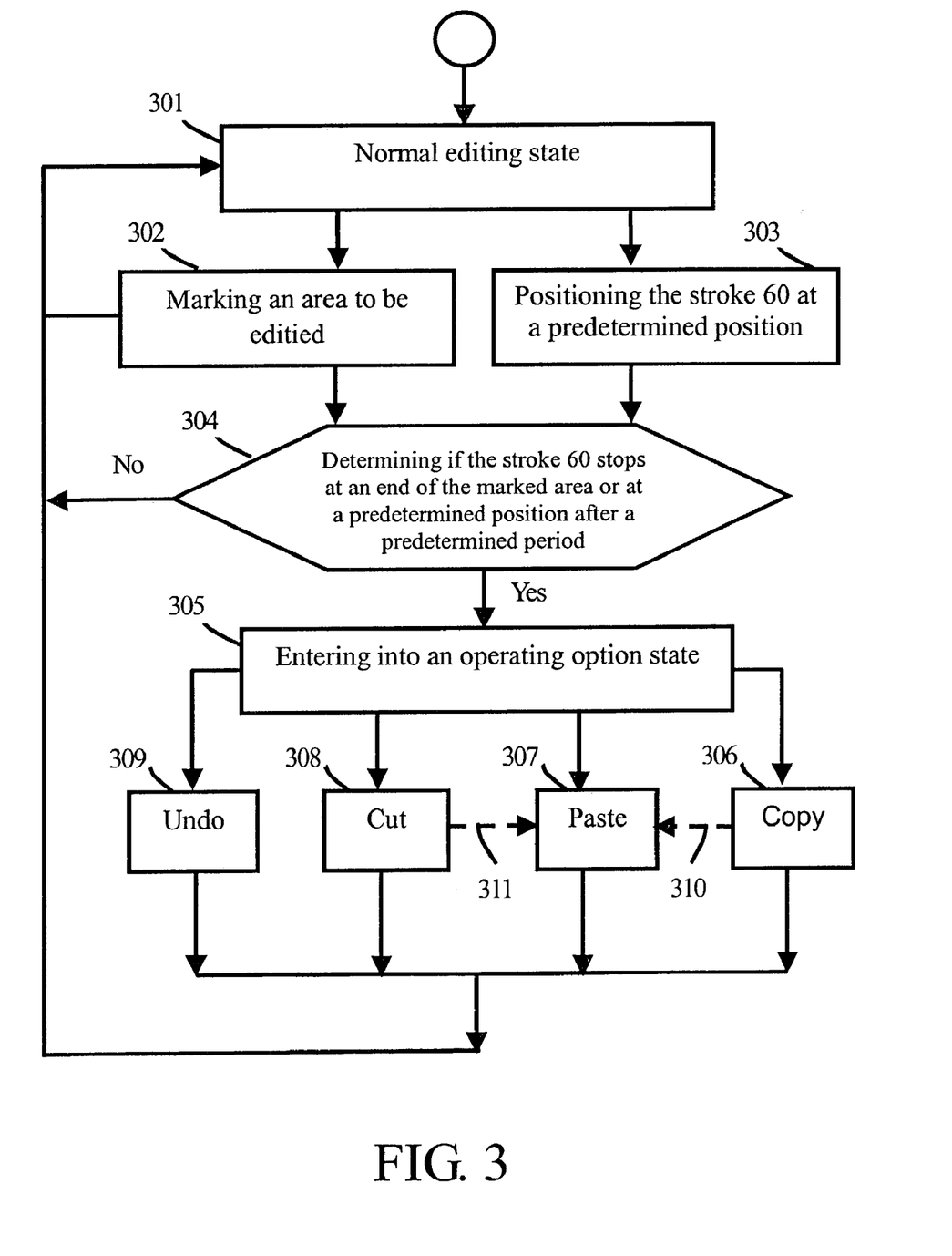
FIG. 3 is a flowchart drawing of the present invention.

Please refer to FIG. 3, and FIG. 4 to FIG. 15. FIG. 3 is a flowchart of the present invention. FIG. 4 to FIG. 15 are schematic drawings according to a plurality of embodiments of the present invention.

Step 301:

A normal editing state, such as a default input state. The computer 10 has not entered into a special editing state of the present invention.

Figure 4:
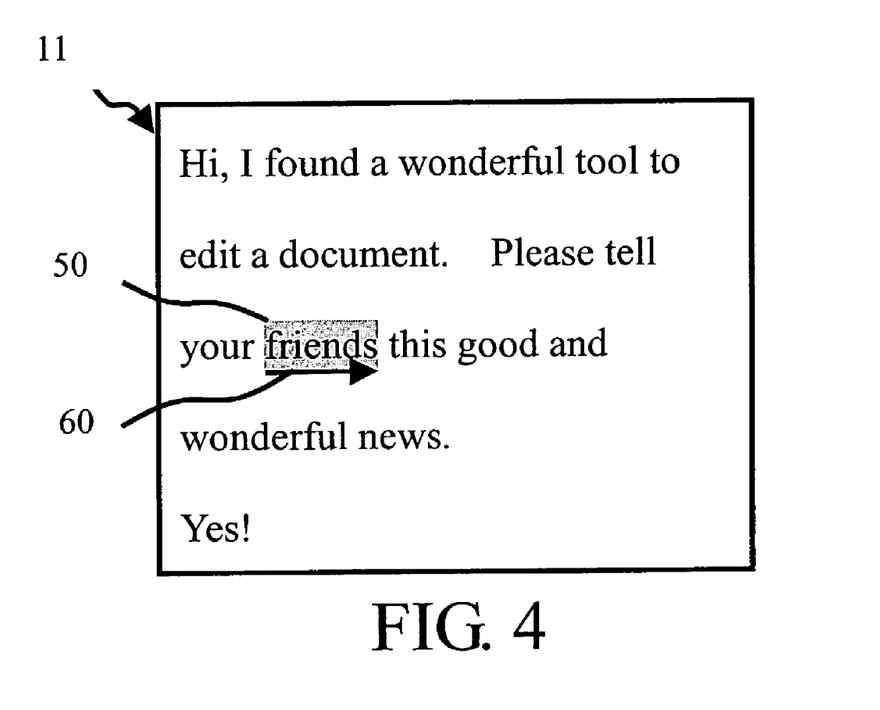
FIG. 4 to FIG. 15 are schematic drawings according to a plurality of embodiments of the present invention.
Figure 5:
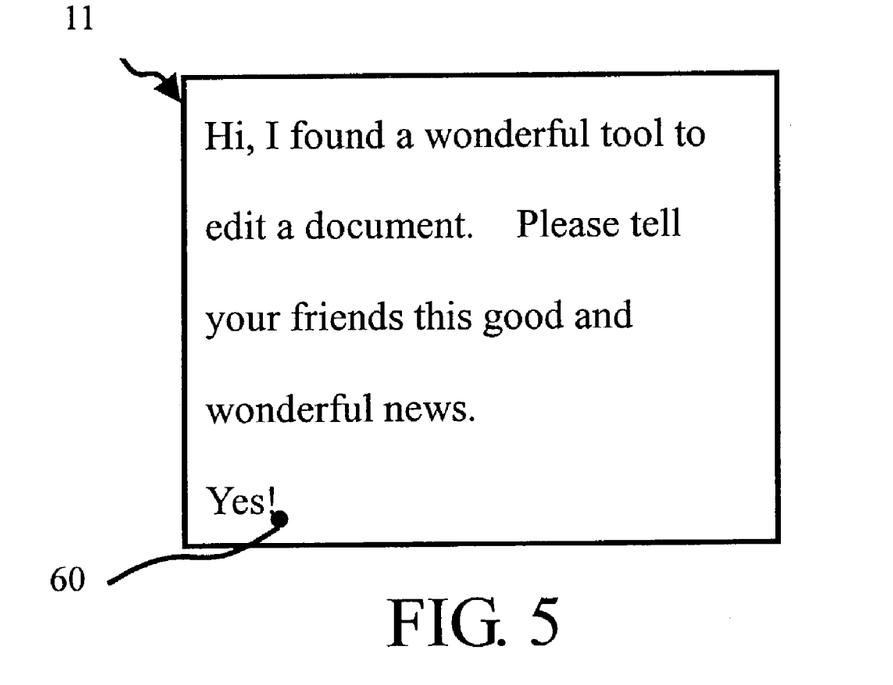

Step 302:

Marking an area to be edited. As shown in FIG. 4, the user utilizes the touch pen to mark a portion of text, such as the text "friends", to generate a marked area 50. A track on the touch screen made by the touch pen is called a stroke 60. This editing operation is a common operation of the prior art editing operation.

Step 303:

Positioning the stroke 60 at a predetermined position. As shown in FIG. 4, this editing operation is a common operation of the prior art editing operation.

Step 304:

Determining if the stroke 60 stops at an end of the marked area or at a predetermined position after a predetermined period.

If the predetermined period is exceeded, the computer will execute step 305; if the predetermined period is not exceeded, the computer will go back to step 301.

Step 305:

Entering into an operating option state; this operating option state is the special editing state of the present invention. Under this editing state, the user can move the stroke 60 to perform different operations.

Figure 6:
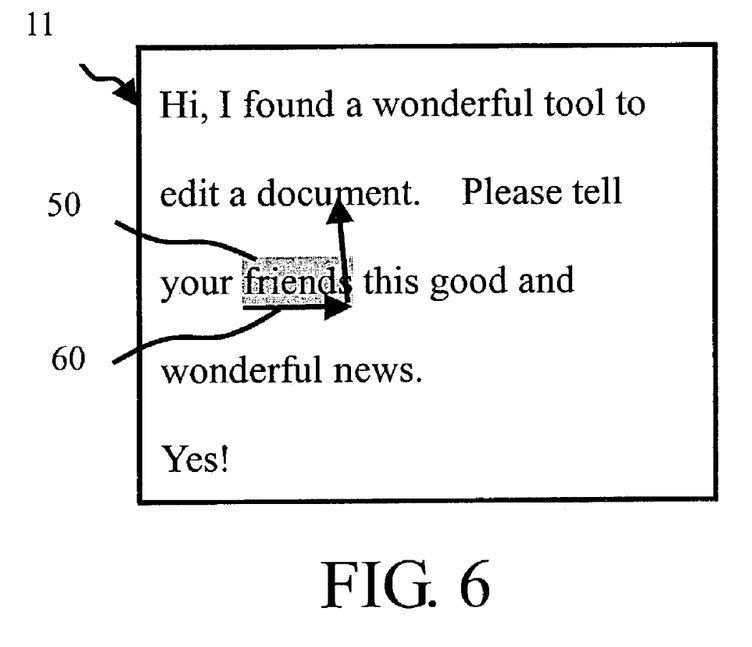

Step 306:

Executing a "copy" operation. As shown in FIG. 6, after the user marks the text "friends", the user moves a subsequent stroke upwards to perform the "copy" operation. Therefore, the text "friends" is saved in the clip board (not shown in the drawing, as the clip board is usually hidden).

Figure 7:
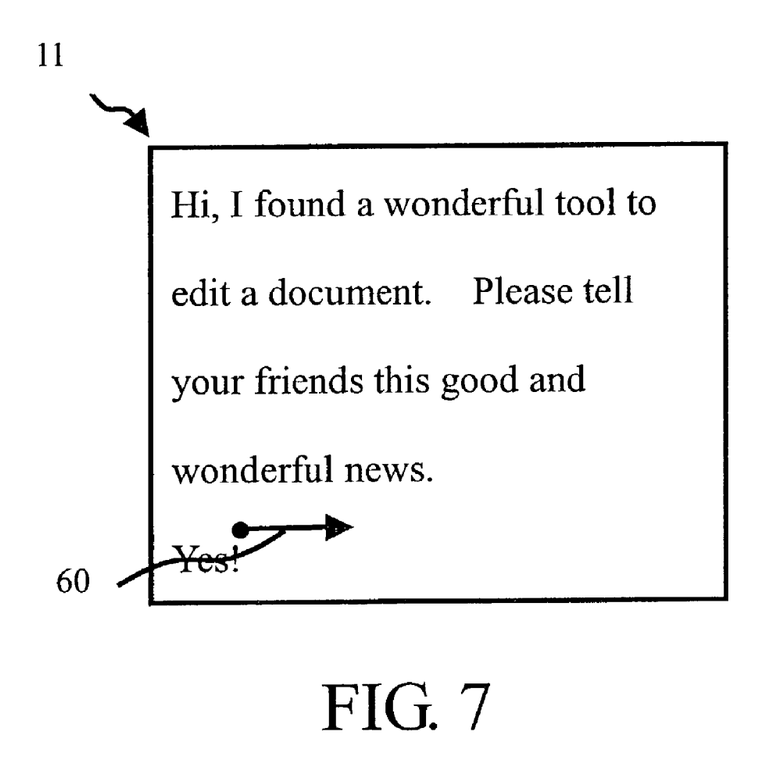
Figure 8:
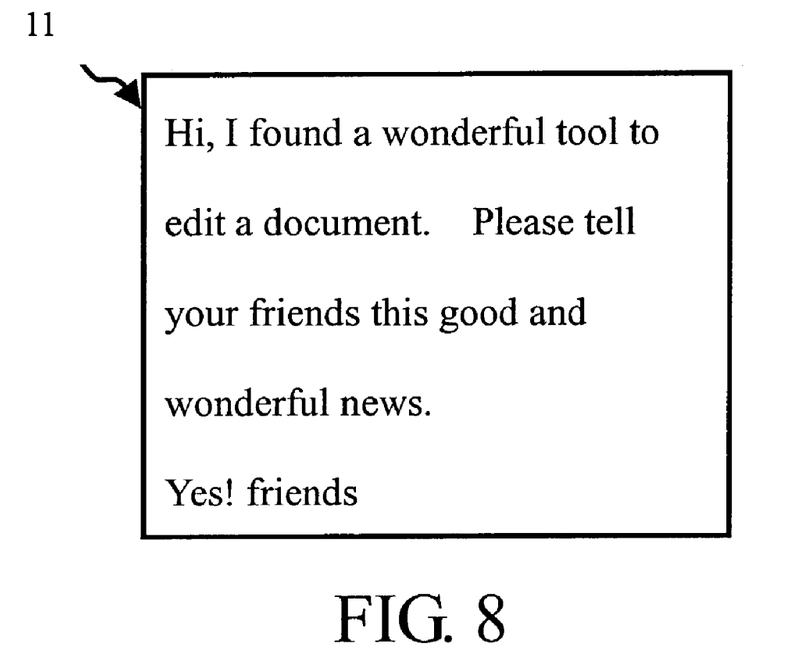

Step 307:

Executing a "paste" operation. For example, after the user finishes step 306 and goes back to step 301, the user stops the stroke 60 after the text "Yes!" after the predetermined period, and the user moves a subsequent stroke towards the right to perform the "paste" operation, as shown in FIG. 7. Therefore, the text "friends" is pasted after the text "Yes!", as shown in FIG. 8.

Figure 9:
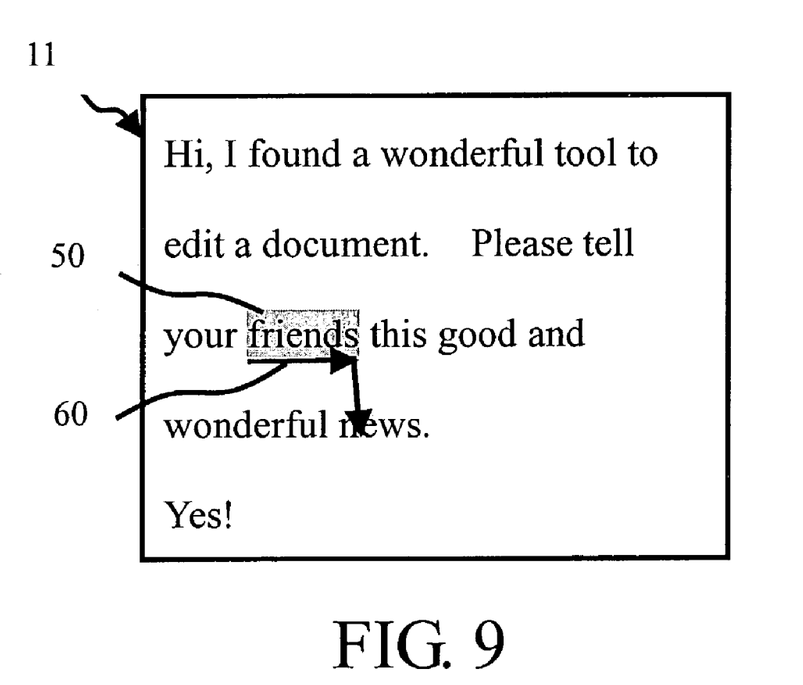
Figure 10:
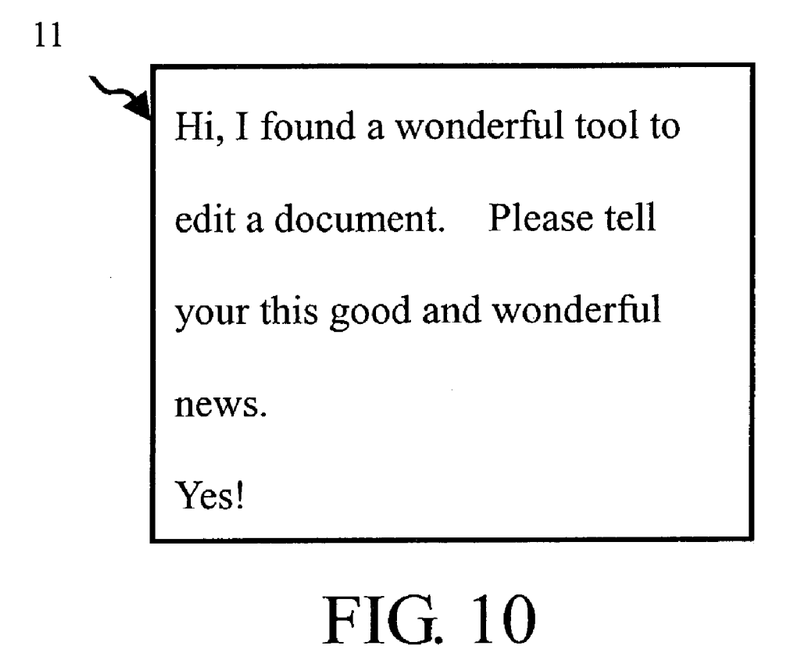

Step 308:

Executing a "cut" operation. As shown in FIG. 9, after the user marks the text "friends", the user moves a subsequent stroke downwards to perform the "cut" operation. Therefore, the text "friends" is cut and saved in the clip board, as shown in FIG. 10.

Figure 11:
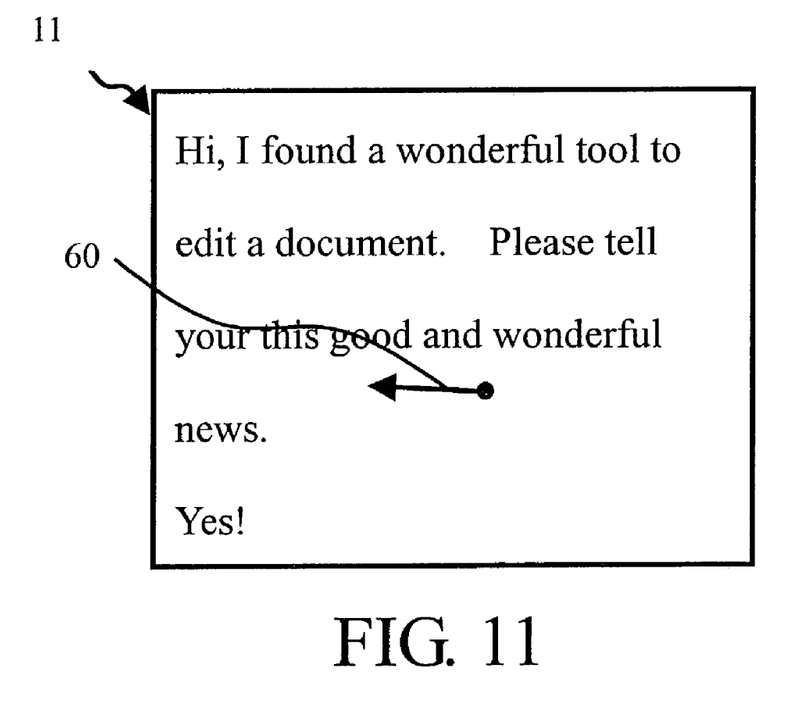
Figure 12:
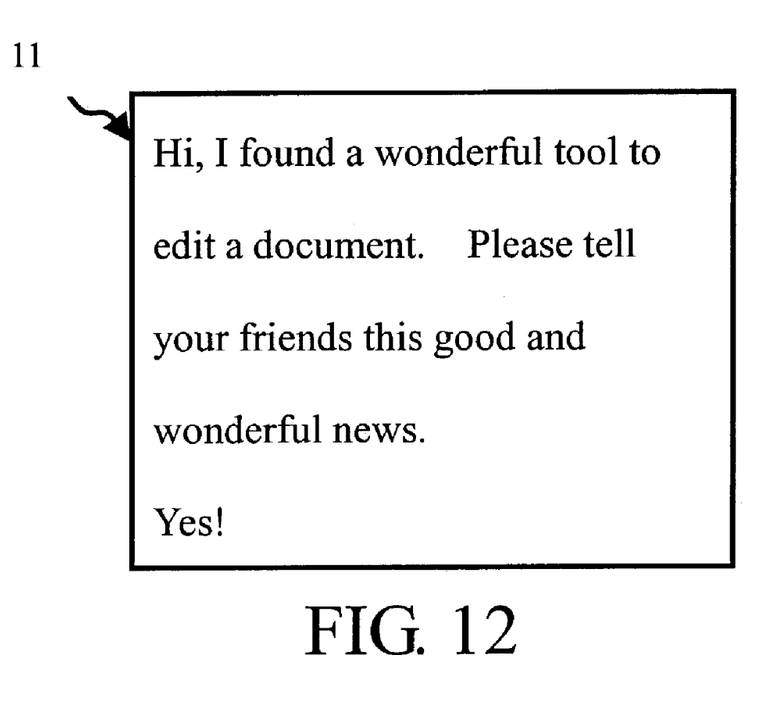

Step 309:

Executing an "undo" operation. For example, after the user finishes step 308 and goes back to step 301, the user stops the stroke 60 at any point on the touch screen 11 after the predetermined period, and the user moves a subsequent stroke towards the left to perform the "undo" operation to recover the last operational state, as shown in FIG. 11. Therefore, the text "friends" is shown on the screen again, as shown in FIG. 12.

Figure 13:
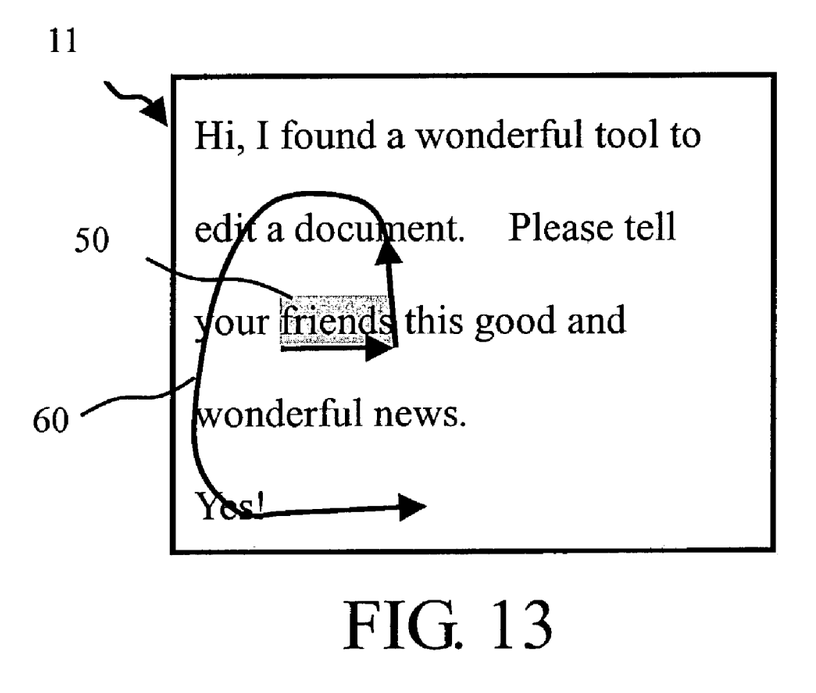

Step 310:

This step combines step 306 and step 307. As shown in FIG. 13, the user moves the stroke 60 upwards first, and then the user moves the stroke 60 to the end of the text "Yes!" and towards the right. The result is as shown in FIG. 8.

Figure 14:
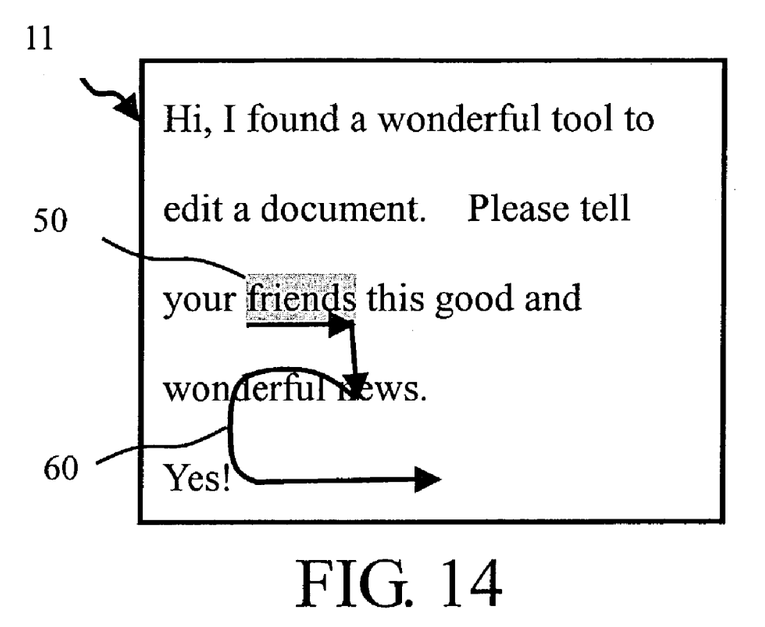
Figure 15:
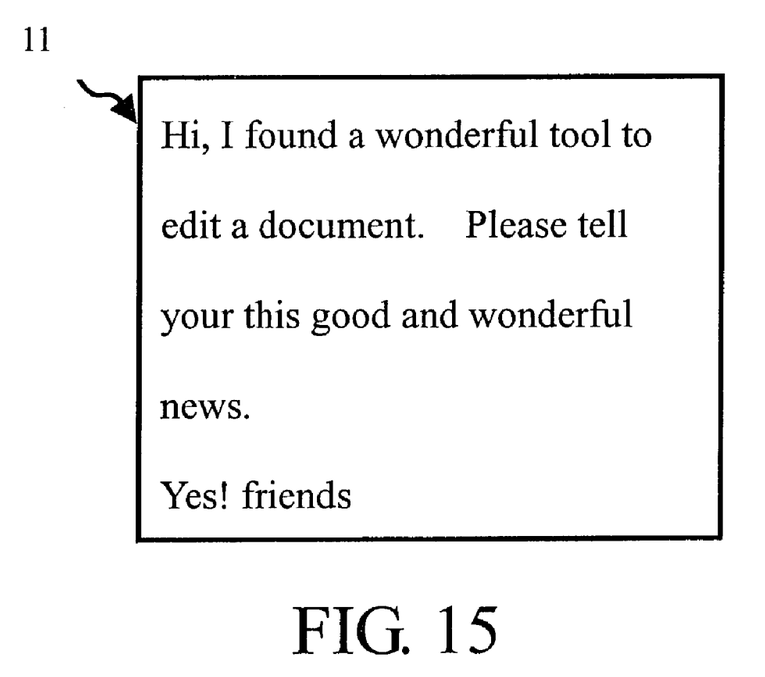

Step 311:

This step combines step 308 and step 307. As shown in FIG. 14, the user moves the stroke 60 downwards first, and then the user moves the stroke 60 to the end of the text "Yes!" and towards the right. The result is as shown in FIG. 15.

Step 310 and step 311 are used to show that the "paste" operation can be performed after the "copy" and the "cut" operation.

The invention has been described using exemplary preferred embodiments. However, for those skilled in this field the preferred embodiments can be easily adapted and modified to suit additional applications without departing from the spirit and scope of this invention. Thus, it is to be understood that the scope of the invention is not limited to the disclosed embodiments. On the contrary, it is intended to cover various modifications and similar arrangements based upon the same operating principle. The scope of the claims, therefore, should be accorded the broadest interpretations so as to encompass all such modifications and similar arrangements.

Although the present invention has been explained in relation to its preferred embodiment, it is to be understood that many other possible modifications and variations can be made without departing from the spirit and scope of the invention as hereinafter claimed.

What is claimed is:

1. A computer with a touch screen enabling a user to control the computer via a touch pen, the computer comprising:

the touch screen enabling the user to input data into the touch screen via the touch pen, wherein a track on the touch screen made by the touch pen is termed a stroke;

a microprocessor;

a memory connected to the microprocessor, comprising a text editing program;

the computer capable of executing the text editing program to display a plurality of text on the touch screen, and enabling the user to input and edit the text via the text editing program; characterized in that:

the memory having an editing operating program, and the microprocessor executing the editing operating program to achieve the following means:

a first means for allowing the user to mark a section of text via the touch pen to enable the marked text to be a marked area; and a second means for determining if a retention period of the stroke exceeds a predetermined period, and when the retention period exceeds the predetermined period, the computer performs different editing means, the editing means comprising:

cutting means for cutting the marked area; and copying means for copying the marked area;

wherein when the computer performs the second means, the cutting means is next performed if a subsequent stroke is downwards, and the copying means is next performed if the subsequent stroke is upwards.

2. The computer as claimed in claim 1 further comprising:

a third means for determining if a retention period of the stroke exceeds a predetermined period when the user stops the stroke at a predetermined position, and when the retention period exceeds the predetermined period, the computer performs different editing means, the editing means further comprising:

a pasting means for pasting a cut or copied text in the marked area.

3. The computer as claimed in claim 2, wherein when the computer performs the third means, if the subsequent stroke is towards the right, the pasting means is next performed.

4. The computer as claimed in claim 1 further comprising:

a third means for determining if a retention period of the stroke exceeds a predetermined period when the user stops the stroke at a predetermined position, and when the retention period exceeds the predetermined period, the computer performs different editing means, the editing means further comprising:

an undo means to undo an edit change previously made by the user.

5. The computer as claimed in claim 4, wherein when the computer performs the third means, if the subsequent stroke is towards the left, the undo means is next performed.

6. A computer readable memory media storing an editing operation software, the editing operation software capable of being controlled by a user via a touch pen, wherein a track on the touch screen made by the touch pen is termed a stroke, and the computer can execute a text editing program to display text on the touch screen, and the user can input and edit the text via the text editing program, the editing operation software comprising:

a first program code allowing the user to mark a section of text via the touch pen to enable the marked text to be a marked area; and a second program code for determining if a retention period of the stroke exceeds a predetermined period, and when the retention period exceeds the predetermined period, causing the computer to perform a different editing program code, the editing program code comprising:

cutting program code for cutting the marked area; and copying program code for copying the marked area;

wherein when the computer performs the second program code, the cutting program code is next performed if a subsequent stroke is downwards, and the copying program code is next performed if the subsequent stroke is upwards.

7. The computer readable memory media as claimed in claim 6 further comprising:

a third program code for determining if a retention period of the stroke exceeds a predetermined period when the user stops the stroke at a position, and when the retention period exceeds the predetermined period, the computer performs different editing program code, the editing program code further comprising:

a pasting program code for pasting a cut or copied text in the marked area.

8. The computer readable memory media as claimed in claim 7, wherein when the computer performs the third program code, if the subsequent stroke is towards the right, the pasting program code is next performed.

9. The computer readable memory media as claimed in claim 6 further comprising:

a third program code for determining if a retention period of the stroke exceeds a predetermined period when the user stops the stroke at a predetermined position, and when the retention period exceeds the predetermined period, the computer performs different editing means, the editing program code further comprising:

an undo program code to undo an edit change previously made by the user.

10. The computer readable memory media as claimed in claim 9, wherein when the computer performs the third program code, if the subsequent stroke is towards the left, the undo program code is next performed.

11. A computer readable memory media storing an editing operation software, the editing operation software capable of being controlled by a user via a touch pen, wherein a track on the touch screen made by the touch pen is termed a stroke, and the computer can execute the text editing program to display text on the touch screen, and the user can input and edit the text via the text editing program, the editing operation software comprising:

a first program code allowing the user to mark a section of text via the touching pen to enable the marked text to be a marked area; and a second program code for determining if a retention period of the stroke exceeds a predetermined period when the user stops the stroke at a position, and when the retention period exceeds the predetermined period, the computer performs different editing program code, the editing program code further comprising:

a pasting program code for pasting a cut or copied text in the marked area;

wherein when the computer performs the second program code, the pasting program code is next performed if a subsequent stroke is towards the right.

12. The computer readable memory media as claimed in claim 11, wherein the editing program code further comprises:

an undo program code to undo an edit change previously made by the user, and when the computer performs the second program code, the undo program code is next performed if the subsequent stroke is towards the left.

* * * * *